Oct. 18, 1932.     G. S. HALL ET AL     1,882,828
MASKING FOR CINEMATOGRAPH AND LIKE SCREENS
Filed Dec. 15, 1930     4 Sheets-Sheet 2
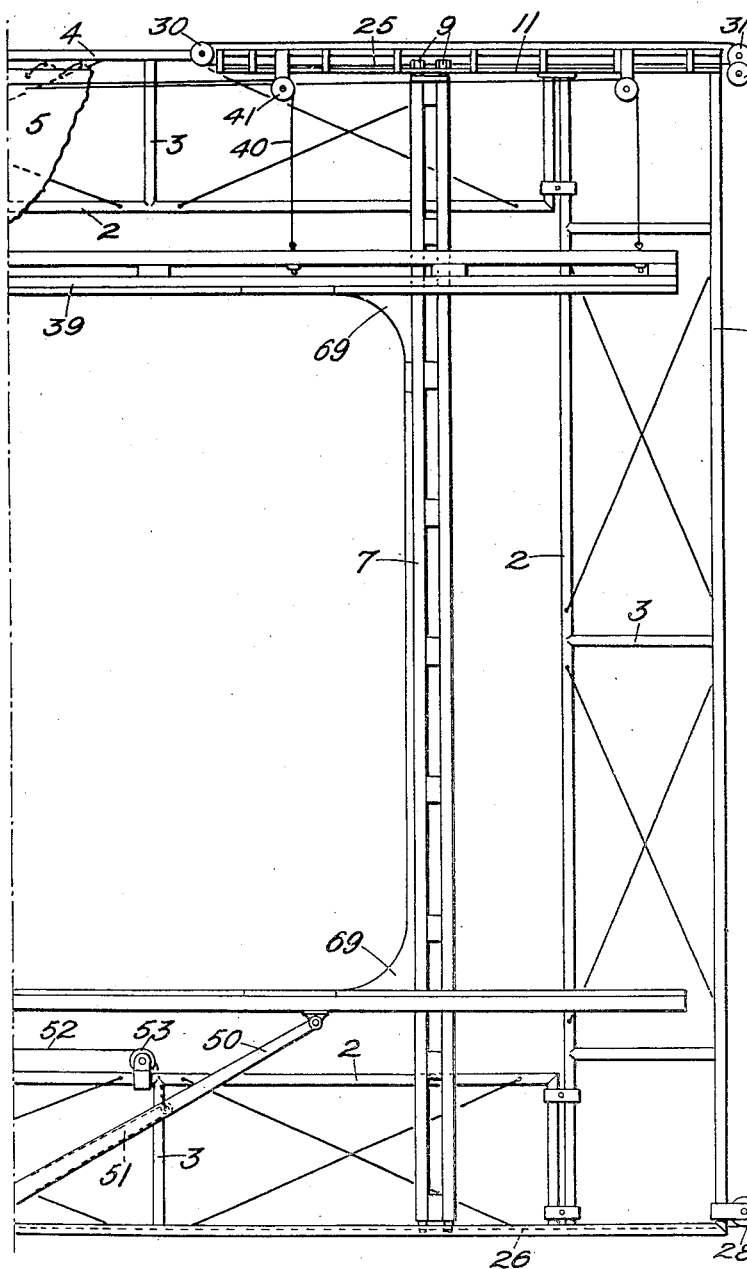
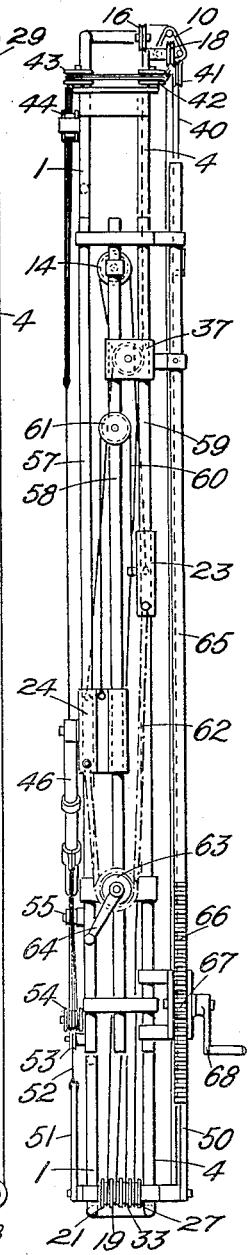

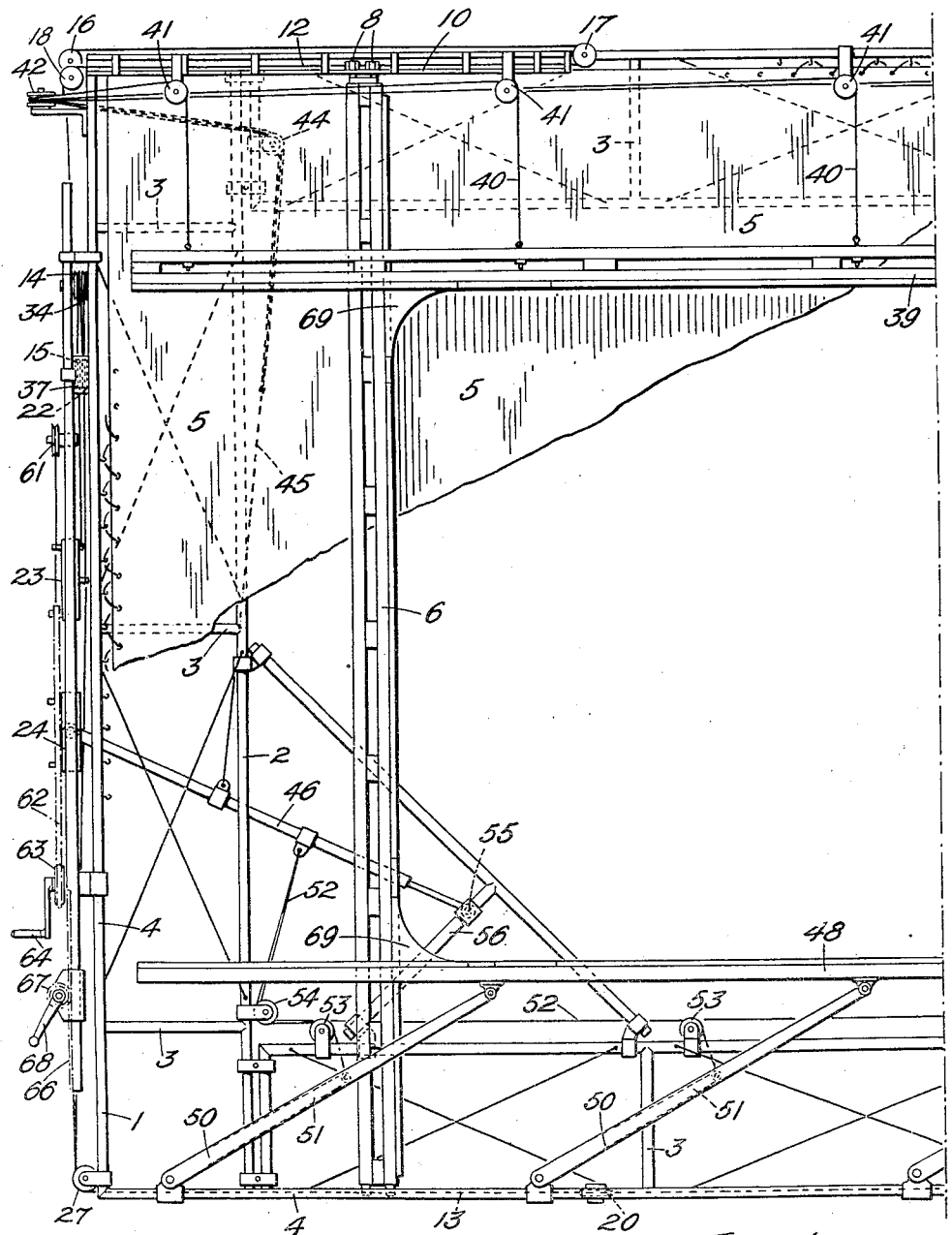

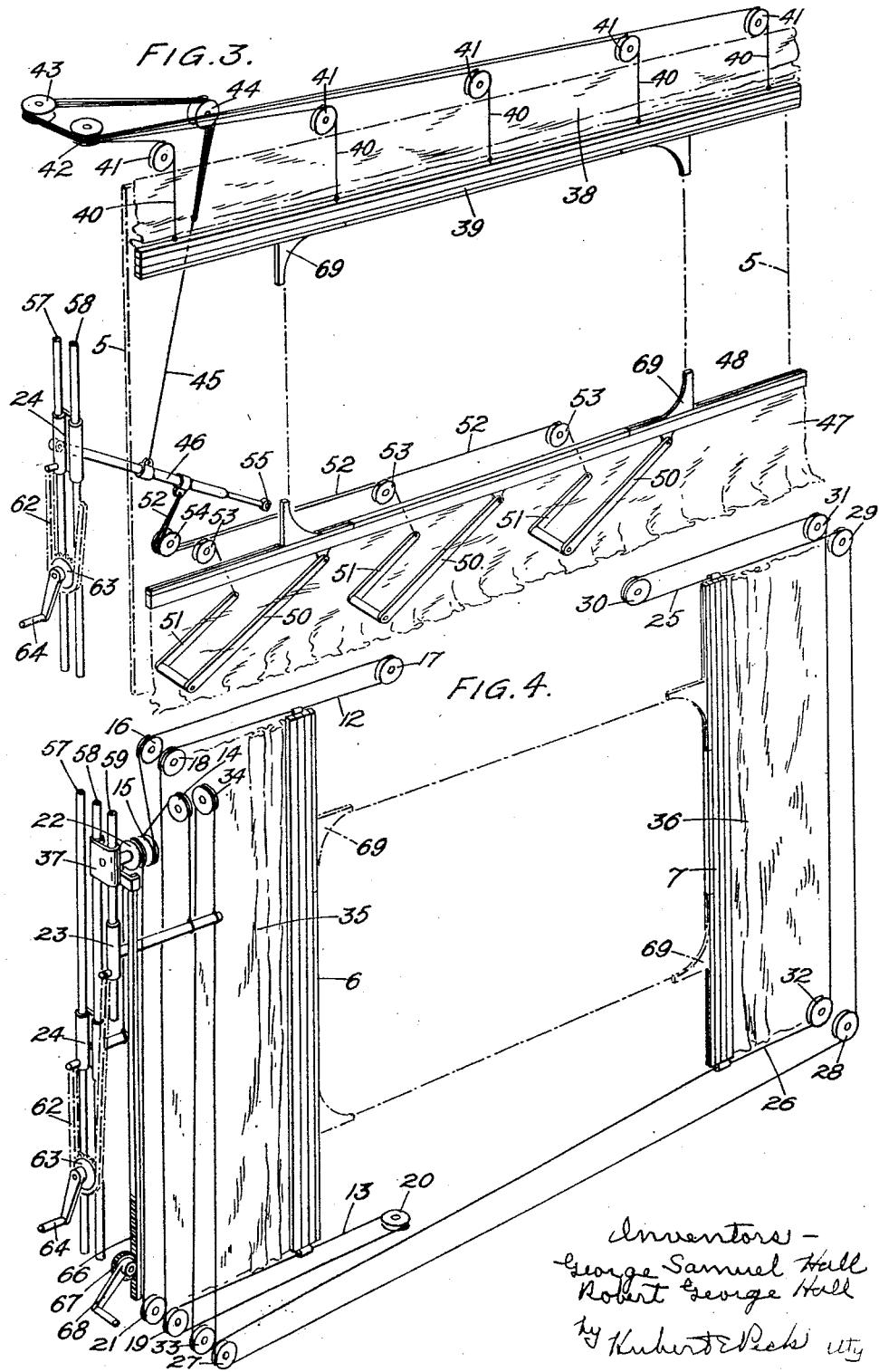

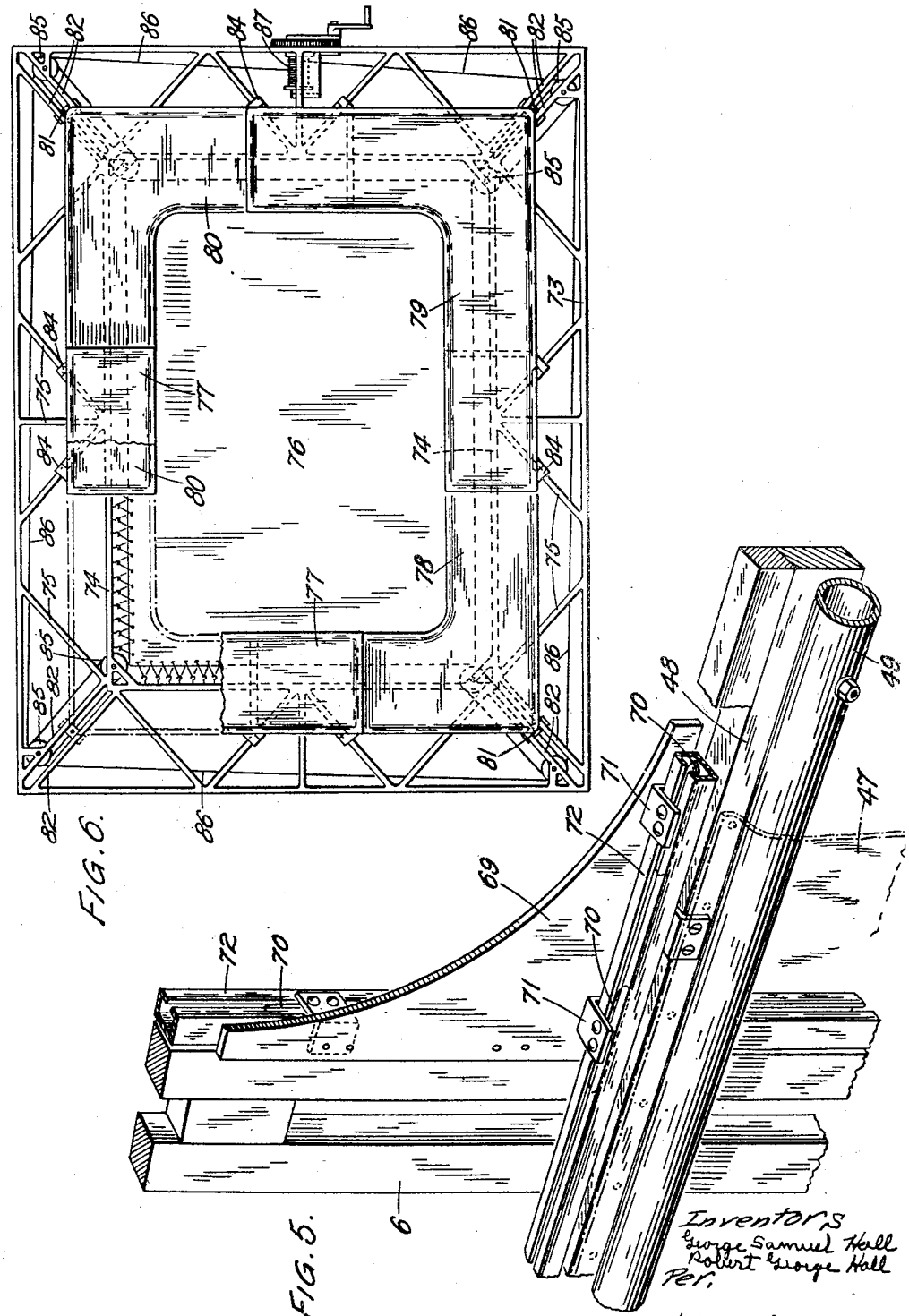

Patented Oct. 18, 1932

1,882,828

UNITED STATES PATENT OFFICE

GEORGE SAMUEL HALL AND ROBERT GEORGE HALL, OF LONDON, ENGLAND

MASKING FOR CINEMATOGRAPH AND LIKE SCREENS

Application filed December 15, 1930, Serial No. 502,562, and in Great Britain January 9, 1930.

This invention relates to maskings for cinematograph and like screens.

It is sometimes required to reduce the effective size of a cinematograph or like screen, as for example, when projecting a picture of a particular kind. In such cirsumstances it is at present usual to employ two screens of different sizes each with its own fixed masking and arranged so that one may be placed in front of the other. When the screens are thus arranged and that at the back is required, whether it be the larger or the smaller, the front screen has to be moved across the back screen. If this be necessary during the projection of a picture the masking is seen to move across the picture. It is an object of the present invention to provide means whereby a single screen may be employed of which the effective area may be varied as required, by which change in the size of the screen is more quickly effected, and in which the disadvantage referred to above does not exist.

The present invention comprises a masking for a cinematograph or like screen constituted of a plurality of parts forming a complete border, for example, a top member, a bottom member and two side members, and means to move the parts relatively and simultaneously to vary the opening in the masking.

In one form of the invention the parts may be mounted to move on a frame or carrier and have guide means to control the movement of the parts, for example, projections on the parts engaging guides on the frame.

According to a further feature of the invention the parts may have interengaging means, such as a projection on one part engaging a slot in the other part, or such interengaging means may comprise corner sections, preferably with a rounded shaped edge, having sliding engagement with a side member and an adjacent top or bottom member.

According to a still further feature of the invention one side member or the parts forming one side of the masking is or are movable alone in relation to the remainder of the masking to enable a side of the screen to be masked as when a "talking" picture is projected.

Forms of the present invention will now be described, by way of example, and with reference to the accompanying drawings wherein:—

Fig. 1 shows a front view with parts broken away of one form of masking mounted in relation to a cinematograph screen, Fig. 2 shows an end view from the left of Fig. 1, Fig. 3 shows a view, partly diagrammatic, of the operating mechanism for the top and bottom members of the masking, Fig. 4 shows a similar partly diagrammatic view of the means for operating the side members of the masking, Fig. 5 shows a detail of the corner of the masking and to an enlarged scale, and Fig. 6 shows a modification of the invention.

Referring to Fig. 1, 1 are the outer members of a frame built up of four rectangular frames 2 connected together and having bracing members 3. The frame is constructed of metal tubing. The outer members 1 of the frame can be seen in Fig. 2. In front of the frame 1 is another frame built up of side members 4 of metal tubing of the same size as the frame constituted by the members 1 and spaced a short distance in front of it. The frame 4 is connected to the frame 1 by spacing and supporting members. The projection screen 5 is laced to the frame 4. The masking illustrated in Figs. 1 to 5 is constituted of four parts, namely, a top member, a bottom member and two side members, the said members being of textile material of any suitable colour. The side members are secured, for example, by nails at their inner edges, that is, the edges toward the centre of the screen to vertical bars of wood 6, 7. The bars 6, 7 are suspended at their upper ends from bobbins 8, 9 respectively which move in tracks 10, 11. Said tracks may be of the kind described in the specification of British Letters Patent No. 332,074. The outer edges of the curtains constituting the side members are attached by tapes to the upright members of the frame 4.

The upper end of the bar 6 is attached to a horizontal reach 12 and the lower end to a horizontal reach 13 of a rope which passes over pulleys 14, 15, 16, 17, 18, 19, 20, 21 and 22 and has its one end connected to a slider 23 and its other end to a slider 24. Similarly the upper end of the bar 7 is connected to a horizontal reach 25 and the lower end to a horizontal reach 26 of a rope which passes over pulleys 27, 28, 29, 30, 31, 32, 33, and 34 and has its ends connected to the slider 23. The arrangement is such that when the sliders 23 and 24 are moved simultaneously towards or away from each other the bars 6 and 7 are moved simultaneously towards or away from each other and the side members of the masking indicated at 35 and 36 are caused to cover the screen to a greater or less extent. The arrangement of these parts is clearly indicated in the partly diagrammatic Fig. 4. The pulleys 15 and 22 are carried on a common shaft and on the slider 37 which may be moved independently of the sliders 23 and 24 by the rack 66 and pinion 67. When the said slider 37 is so moved the bar 6 and consequently the side member 35 of the mask is altered in position in relation to the screen 5 irrespective of the other side member 36. For example, should the slider 37 be moved downwards the bar 6 will be moved inwards towards the centre of the screen.

The top member of the masking is in the form of a curtain 38 which is attached at its lower end to a transverse wooden bar 39 and at its upper edge to the top member of the frame 4. The bar 39 is supported by a number of ropes 40 which pass over pulleys 41, 42, 43, 44 and are eventually secured to form a common rope 45 which is attached to a telescopic arm 46. The curtain 38 is threaded on the ropes 40 so that when the bar 39 is raised the curtain is raised in pleats. The bottom member of the masking also comprises a curtain 47 which is carried at its upper edge on a transverse bar of wood 48. Said bar carries at the back a metal tube 49 by which it is pivotally connected to a series of arms 50 pivoted at their lower ends to the bottom members 1 and 4 of the two frames. Shorter and parallel arms 51 are arranged at the rear of the arms 50 and are rigidly connected thereto. Said arms 51 are connected by ropes 52 passing over pulleys 53, 54, to the telescopic arm 46. Said arm 46 is pivotally mounted at one end at 55 on a frame member 56 carried on the parts 2 of the rear frame. At its other end it is pivotally attached to the slider 24. The arrangement which is illustrated more or less diagrammatically in Fig. 3 is thus such that when the slider 24 is moved upwards the top member 38 of the masking is lowered, and the bottom member 47 is raised by a parallel ruler motion. Similarly when the slider 24 is moved downwards the top and bottom members of the masking move apart.

The slider 24 slides on two parallel vertical rods or tubes 57, 58 and the slider 23 moves on a third vertical rod or tube 59, parallel with the other two. The rods or tubes 57, 58 and 59 are arranged at the side of the frames 1 and 4. The sliders 23 and 24 are connected by a rope 60 passing over a fixed pulley 61 and by a chain 62 passing round a sprocket wheel 63 which may be rotated by a handle 64. By the side of the rods or tubes 57, 58 and 59 is a vertical rod 65 carrying a rack 66 with which engages a toothed wheel 67 which may be rotated by a handle 68. The rod 65 is at its upper end attached to the slider 37 which slides on the rods or tubes 58, 59 and carries the pulleys 15 and 22. Thus by operating the handle 68 the side member 35 of the masking may be moved towards or away from the centre of the screen independently of the movement of the other members of the masking and by operating the handle 64 all four members of the masking are moved towards or away from each other simultaneously, so that the effective area of the screen may be varied as desired and at the same time one side of the screen may be masked when a "talking" picture is projected to cut off that portion of the screen which would otherwise receive an image of the sound record on the film. The points of attachment of the ropes 45 and 52 to the arm 47 are adjustable so that the relative positions of the top and bottom members of the masking may be adjusted as desired. The transverse bars 39 and 48 and the vertical bars 6 and 7 are connected by the shaped corner sections 69 which have slides 70 mounted thereon by the brackets 71 to move in slotted members 72 carried on the respective transverse and vertical bars. The shaped corner sections 69 thus serve as interengaging means between the parts of the masking and also provide a rounded corner therefor.

In the form of the invention illustrated in Fig. 6 the masking is formed of four right angle shaped sections. A metal frame is constructed of two rectangular frames, namely an outer frame 73 and an inner frame 74 connected by bracing members 75. The cinematograph screen 76 is mounted on the inner frame 74 with means to stretch it in the usual way. The four right angle shaped members 77, 78, 79 and 80 are of black material, for example, black cloth stretched on right angle frames. Said right angle members are movably mounted on the rectangular frames 73, 74 by projections 81 which engage parallel bracing members 82 spaced a short distance apart and extending between the corners of the inner and outer frames. Said parallel bracing members constitute guides for the projections. Each right angle part also carries ring shaped guide members 84 which embrace bracing members disposed at an angle of 45° to the sides of the frames so that the right angle members move outwardly from each corner of the inner frame 74. The frames of adjacent right angle members are also connected by a pin on a frame of one member which engages a slot in the adjacent frame. Such pin connections are not shown in the drawings and it will be understood that other forms of connection may be employed so that the frames of the right angle members will slide one over the other. Pulleys 85 are mounted at adjacent corners of each of the rectangular frames 73, 74 and a wire rope 86 passes over said pulleys and is connected at its ends to a winch 87 mounted on one side of the frame 73.

Each right angle member of the masking is connected to the wire rope 86 by means of a pin projecting from its corner. The arrangement is such that when the winch 87 is operated the right angle parts of the masking are moved simultaneously towards or away from the centre of the screen. At the same time said parts move over each other and thus the effective size of the screen may be varied as desired.

In this form of the invention two of the right angle members constituting a side of the masking may be mounted to move outward or inward in relation to the frames 73, 74 carrying the remainder of the masking so as to cover one side of the screen when such is necessary, as for example, when projecting a "talking" film to mask the sound recording at the side of the film.

It will be understood that various modifications may be made without departing from the invention. For example, instead of wires or ropes and pulleys gearing may be employed and driving means may be provided which may be operated from a distance, as, for example, electrical driving means which may be controlled from the projector operator's box. The frame may be built of rods or bars.

What we claim is:—

1. A masking for a projection screen comprising a plurality of parts forming the sides, top and bottom of a complete border around the screen, common operating means for moving all of said parts simultaneously to vary the size of opening in the masking, the centre of said opening remaining unaltered, and operating means for moving a part of said border forming one side thereof independently of the remainder of the masking.

2. A masking for a projection screen, comprising a plurality of parts forming the sides, top and bottom of a complete border around the screen, a frame in which said parts are supported and guided, common operating means for moving all of said parts simultaneously to vary the size of the opening in the masking whilst retaining its centre unaltered, and operating means for moving a part of said border forming one side thereof independently of the remainder of the masking.

3. Projection arrangement comprising a screen, a plurality of masking parts forming a complete border around the screen, common operating means for moving all of said parts simultaneously for varying the size of opening within the border, operating means for moving a side masking part independently of the other parts, and a frame carrying said screen, masking parts and operating means.

4. A masking for a projection screen, comprising a plurality of masking sections forming a complete border around the screen, parts of said sections providing rounded corners for the opening in the border, common operating means for moving all of the sections simultaneously to vary the size of opening within the border, whilst retaining its centre unaltered, and operating means for moving a masking section forming a side of said border independently of the remainder of the masking, the rounded corners being properly provided by the said parts of the masking sections irrespective of the movement imparted by the operating means.

5. A masking for a projection screen, comprising vertical and horizontal masking parts forming a complete border around the screen, corner-pieces shaped to provide rounded corners to the opening in the border, sliding connections between each of said corner-pieces and the vertical and horizontal parts which meet to form the corner, and operating means for adjusting one at least of said masking sections in relation to the others.

6. A masking for a projection screen, comprising a plurality of masking parts of right angle L shape forming the top, bottom and sides of a border surrounding the screen and operating means for moving all of said masking parts on diagonal lines between the corners to vary the size of opening in the border whilst maintaining the centre thereof in the same position.

7. Projection arrangement comprising a screen, a plurality of masking-parts of L shape forming a complete border around the screen, frame parts having diagonal guides upon which said masking-parts are guided, operating means for adjusting said masking parts simultaneously upon said guides, and operating means for adjusting one frame part transversely in relation to the other for the purpose of adjusting one side of the border independently of the rest of the border.

8. A masking for a projection screen comprising top, bottom and side masking sections forming a complete border, slidable interengaging connections between said sections at the corners thereof and operating means for moving all of said sections simultaneously for varying the size of the opening in the border and for moving one side section alone to vary the position of one lateral edge of the opening.

9. A masking for a projection screen comprising top, bottom and side masking sections, rope-gear connected to said masking sections, operating means for adjusting said rope-gear to move all of said sections simultaneously for varying the size of the opening in the masking and to move one side section alone.

10. A masking for a projection screen comprising top, bottom and side masking sections, rope gear connected to said masking sections, said gear including a movable pulley engaging a bight in a rope of said gear connected to one side section, operating means for adjusting said rope gear to move all of the sections simultaneously to vary the size of the opening in the masking, and operating gear for adjusting said movable pulley to move said one side section independently of the other sections.

11. A masking for a projection screen comprising top, bottom and side masking sections, rope gear connected to said sections including ropes connected to the top and bottom sections, operating mechanism connected to the rope gear for adjusting all of the sections simultaneously to vary the mask-opening and for adjusting one side section alone, and a pivotal lever connecting said mechanism with the ropes of the top and bottom sections.

12. A masking for a projection screen according to claim 11 provided with adjustable attachment means for varying the point of connection of the ropes with the pivoted lever.

13. A masking for a projection screen comprising movable top, bottom and side masking sections, operating mechanism for adjusting all of said sections simultaneously for varying the mask-opening and for adjusting one side section alone, and a parallel ruler device supporting the bottom masking section and connecting it with the operating mechanism.

14. A masking for a projection screen comprising movable top, bottom and side sections, rope gear connected to said sections, including a rope having a bight and connected to one of the side sections, two relatively movable members connected to the rope gear and operating mechanism for adjusting said members relatively to each other to move all the masking sections simultaneously and thereby vary the mask-opening, a pulley engaging the aforementioned bight and operating mechanism for adjusting the position of said pulley and thereby moving said one side section independently of the other sections.

Dated this 28th day of November, 1930.

GEORGE SAMUEL HALL.
ROBERT GEORGE HALL.